US 9,477,231 B2

(12) United States Patent
Miyata et al.

(10) Patent No.: US 9,477,231 B2
(45) Date of Patent: Oct. 25, 2016

(54) CONTROL SYSTEM FOR VARIABLE DISPLACEMENT PUMP (71) Applicant: HONDA MOTOR CO., LTD., Tokyo (JP)

(72) Inventors: Satoru Miyata, Wako (JP); Naoki Nishimura, Wako (JP); Keiichi Nishiyama, Wako (JP); Ryo Matsui, Wako (JP); Tomoaki Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 511 days.

(21) Appl. No.: 14/113,988

(22) PCT Filed: Jan. 21, 2013

(86) PCT No.: PCT/JP2013/051097
§ 371 (c)(1),
(2) Date: Oct. 25, 2013

(87) PCT Pub. No.: WO2013/150808
PCT Pub. Date: Oct. 10, 2013

(65) Prior Publication Data
US 2014/0163748 A1 Jun. 12, 2014

(30) Foreign Application Priority Data
Apr. 3, 2012 (JP) .................................. 2012-084992

(51) Int. Cl.
*F04B 49/02* (2006.01)
*G05D 7/06* (2006.01)
(Continued)

(52) U.S. Cl.
CPC ............. *G05D 7/0617* (2013.01); *F04B 17/05* (2013.01); *F04B 49/02* (2013.01); *F04B 49/06* (2013.01);
(Continued)

(58) Field of Classification Search
CPC .. F16H 61/0025; F16H 61/38; F04C 15/008; B60W 30/20; F15B 2211/6651
See application file for complete search history.

(56) References Cited

U.S. PATENT DOCUMENTS

| 5,531,070 A | * | 7/1996 | Berger | .................... F02D 17/04 |
| | | | | 123/198 DB |
| 2007/0142168 A1 | * | 6/2007 | DeMarco | ............ B60W 30/194 |
| | | | | 477/41 |
| 2011/0010063 A1 | | 1/2011 | Ota et al. | |

FOREIGN PATENT DOCUMENTS

| FR | 2 122 951 A5 | 9/1972 |
| JP | 03-186649 A | 8/1991 |

(Continued)

OTHER PUBLICATIONS

European Search Report application No. 13772799.6 dated Mar. 27, 2014.
(Continued)

*Primary Examiner* — Thomas E Lazo
*Assistant Examiner* — Abiy Teka
(74) *Attorney, Agent, or Firm* — Squire Patton Boggs (US) LLP (57) ABSTRACT

A control system for a variable displacement pump driven by a drive source for driving a vehicle is provided. The variable displacement pump pressurizes hydraulic oil, and is switchable between a full capacity operation in which a discharge flow rate is maximized and a partial capacity operation in which the discharge flow rate is lower than that in the full capacity operation. It is determined whether an operation for starting the drive source has been performed. A rotational speed of the drive source and a temperature of the hydraulic oil are detected. When the rotational speed of the drive source is equal to or higher than a predetermined rotational speed and the hydraulic oil temperature is equal to or lower than a predetermined temperature, immediately after the operation for starting the drive source is performed, the partial capacity operation of the variable displacement pump is performed. This control suppresses generation of untoward noises caused by the operation of the variable displacement pump when starting to drive the vehicle.

2 Claims, 6 Drawing Sheets (51) Int. Cl.
   *F04B 49/06* (2006.01)
   *F04C 14/26* (2006.01)
   *F04B 17/05* (2006.01)
   *F04C 2/344* (2006.01)
   *F04C 15/00* (2006.01)
   *F16H 61/38* (2006.01)
   *F16H 61/00* (2006.01)
   *F04C 14/06* (2006.01)
   *F16H 59/72* (2006.01)

(52) U.S. Cl.
   CPC .............. *F04C 2/3446* (2013.01); *F04C 14/26* (2013.01); *F04C 15/008* (2013.01); *F16H 61/0025* (2013.01); *F16H 61/38* (2013.01); *F04B 2203/0209* (2013.01); *F04B 2203/0605* (2013.01); *F04B 2203/0606* (2013.01); *F04B 2205/11* (2013.01); *F04C 14/06* (2013.01); *F04C 2270/86* (2013.01); *F16H 59/72* (2013.01); *F16H 2312/20* (2013.01)

(56) References Cited

FOREIGN PATENT DOCUMENTS

| | | |
|---|---|---|
| JP | 2001-140771 A | 5/2001 |
| JP | 2010-78021 A | 4/2010 |
| JP | 2011-163258 A | 8/2011 |
| JP | 2011-196390 A | 10/2011 |

OTHER PUBLICATIONS

International Search Report dated Apr. 16, 2013 corresponding to International Patent Application No. PCT/JP2013/051097 and English translation thereof.

* cited by examiner

CONTROL SYSTEM FOR VARIABLE DISPLACEMENT PUMP

TECHNICAL FIELD

The present invention relates to a control system for a variable displacement pump which is capable of changing a discharge flow rate in a fixed rotational speed state thereof, and more particularly to a system for controlling a variable displacement pump which is a hydraulic pump driven by a drive source for driving a vehicle, such as an internal combustion engine, and pressurizes hydraulic oil supplied to a hydraulic actuator.

BACKGROUND ART

Patent Document 1 (shown below) discloses a variable displacement pump capable of changing a discharge flow rate in a state in which the rotational speed thereof is fixed. This variable displacement pump includes two suction ports and two discharge ports, and is configured to be capable of switching between a full capacity operation in a state in which the two discharge ports are completely shut off from the two suction ports, and a half capacity operation in a state in which one of the discharge ports is communicated with the suction ports. In the half capacity operation, the discharge flow rate is equal to half of that in the full capacity operation under the condition of the same rotational speed. This variable displacement pump is incorporated in a hydraulic controller of an automatic transmission for a vehicle, and is driven by an internal combustion engine that drives the vehicle. The variable displacement pump supplies hydraulic oil (hydraulic pressure) necessary for a hydraulic actuator provided in the hydraulic controller.

PRIOR ART DOCUMENT

Patent Document

Patent Document 1: Japanese Laid-Open Patent Publication No. 2011-163258

SUMMARY OF THE INVENTION

Problems to be Solved by the Invention

It has been confirmed that after leaving a vehicle provided with the hydraulic controller shown in Patent Document 1, for a certain time period in a low temperature state, there arises a problem that untoward noises are generated from the hydraulic controller when operation of the vehicle is started. The cause of this problem is not definitely clear but is presumed as follows.

In general, a reservoir for storing hydraulic oil for hydraulic control is provided with a strainer for straining out foreign matter mixed in the hydraulic oil. When the vehicle is left without being driven for a certain time period, the hydraulic oil flows out of the hydraulic actuator so that no hydraulic oil is in the hydraulic actuator. Accordingly, when the engine is started in this state, the hydraulic oil supplied to the empty hydraulic actuator passes through the strainer at an increased flow rate and also negative pressure downstream of the strainer increases. It is presumed that untoward noises are generated when both of the above-mentioned condition and the condition that foreign matter is captured in the strainer and the temperature of hydraulic oil is low, are satisfied.

The present invention has been made to provide a solution to this problem, and an objective thereof is to provide a control system which is capable of suppressing generation of untoward noises caused by the operation of a variable displacement pump at the start of driving a vehicle.

Solution to the Problem

To attain the above object, the present invention provides a control system for a variable displacement pump (62) for pressurizing hydraulic oil. The variable displacement pump is driven by a drive source (1) for driving a vehicle, and is switchable between a full capacity operation in which a discharge flow rate is maximized and a partial capacity operation in which the discharge flow rate is lower than the full capacity operation. The control system includes operation start determining means, drive source rotational speed detecting means, oil temperature detecting means, and starting operation control means. The operation start determining means determining that an operation for starting the drive source (1) has been performed. The drive source rotational speed detecting means detects a rotational speed (NE) of the drive source, and the oil temperature detecting means detects a temperature (TOIL) of the hydraulic oil. The starting operation control means performs the partial capacity operation of the variable displacement pump (62) when the rotational speed (NE) of the drive source is equal to or higher than a predetermined rotational speed (NESCS) and the temperature (TOIL) of the hydraulic oil is equal to or lower than a predetermined temperature (TLTH) immediately after the operation for starting the drive source is performed.

With this configuration, when the rotational speed of the drive source is equal to or higher than the predetermined rotational speed and the temperature of the hydraulic oil is equal to or lower than the predetermined temperature, immediately after the operation for starting the drive source is performed, the partial capacity operation of the variable displacement pump is performed. The untoward noises tend to be loud when the rotational speed of the drive source becomes equal to or higher than the predetermined engine rotational speed to make the rotational speed of the variable displacement pump become relatively high, and the temperature of the hydraulic oil is equal to or lower than the predetermined temperature, immediately after the start of the drive source. Accordingly, by performing the partial capacity operation when these conditions are satisfied, it is possible to effectively suppress generation of the untoward noises.

The vehicle includes an automatic transmission (4) and a hydraulic controller (40) for controlling the automatic transmission, and the hydraulic controller (40) includes a hydraulic actuator (63, 64, 25c, 27c), an oil supply passage (72, 72a, 72b, 73, 74) for supplying hydraulic oil from a discharge port of the variable displacement pump to the hydraulic actuator, an oil return passage (75) for returning the hydraulic oil from the hydraulic actuator to a suction port of the variable displacement pump, and oil pressure detecting means for detecting hydraulic pressure (PDN) in the oil supply passage. The starting operation control means preferably switches the partial capacity operation to the full capacity operation when the detected hydraulic pressure (PDN) reaches a predetermined oil pressure (PDNTH) after starting the partial capacity operation.

With this configuration, when the detected hydraulic pressure reaches the predetermined oil pressure after starting the partial capacity operation, the partial capacity operation is switched to the full capacity operation. When the oil pressure in the oil supply passage reaches the predetermined oil pressure, the hydraulic oil starts to be recirculated to the suction port via the oil return passage, which reduces a negative pressure at the suction port, and hence even when the operation of the variable displacement pump is switched to the full capacity operation, no loud untoward noise is generated. Accordingly, by switching the partial capacity operation to the full capacity operation when the detected hydraulic pressure reaches the predetermined oil pressure, it is possible to quickly increase the hydraulic pressure at the start of operation, by minimizing a time period during which the partial capacity operation is performed.

Preferably, when the drive source (1) is temporarily stopped after the rotational speed (NE) of the drive source becomes equal to or higher than the predetermined rotational speed (NESCS), the starting operation control means does not perform the partial capacity operation upon starting the operation immediately after the temporary stoppage of the drive source.

With this configuration, when the drive source is temporarily stopped after the rotational speed thereof becomes equal to or higher than the predetermined rotational speed, the partial capacity operation is not performed upon starting the operation immediately after the temporary stoppage. When the drive source is temporarily stopped after starting the operation thereof, the hydraulic oil remains in the hydraulic actuator, and hence the hydraulic oil is supplied from the hydraulic actuator to the variable displacement pump via the oil return passage even immediately after starting the operation so that the negative pressure downstream of the strainer (negative pressure at the suction port of the variable displacement pump) is relatively small. Accordingly, in such case, the possibility of generation of untoward noises is low, and hence by avoiding unnecessary execution of the half capacity operation, it is possible to obtain advantageous effects of preventing delay in the initial rise of the hydraulic pressure when starting the operation, and thereby preventing degradation of the start control response and reduction in the lubrication performance.

More specifically, the variable displacement pump includes a plurality of suction ports (136a, 136b) and a plurality of discharge ports (137a, 137b), and the full capacity operation is performed by placing the plurality of discharge ports in a state completely shut off from the plurality of suction ports, and the partial capacity operation is performed by making at least one of the discharge ports communicate with at least one of the suction ports.

MODE FOR CARRYING OUT THE INVENTION

The present invention will now be described in detail with reference to drawings showing a preferred embodiment thereof.

Figure 1:
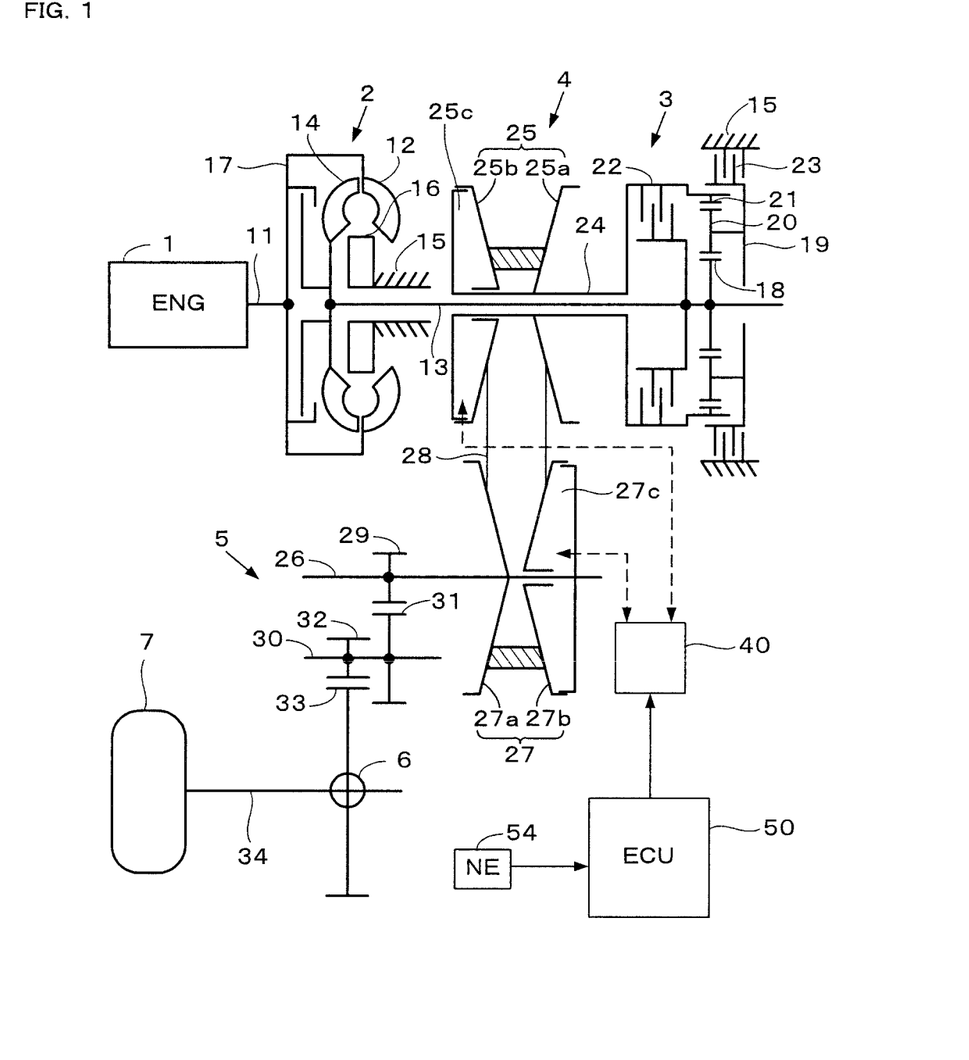
FIG. 1 A diagram showing a configuration of a vehicle drive system including an automatic transmission and a hydraulic controller according to one embodiment of the present invention.

FIG. 1 is a diagram showing a configuration of a vehicle drive system including an automatic transmission and a hydraulic controller according to one embodiment of the present invention. As shown in FIG. 1, the driving force of an internal combustion engine (hereinafter simply referred to as "engine") 1 is transmitted to drive wheels 7 via a torque converter 2, a forward/backward travel switching mechanism 3, a belt-type continuously variable transmission (hereinafter referred to as the "CVT") 4, a reduction gear train 5, and a differential gear 6.

The torque converter 2 comprises a pump 12 connected to a crankshaft 11 of the engine 1, a turbine 14 connected to an input shaft 13, a stator 16 fixed to a casing 15, and a lockup clutch 17 for directly connecting the crankshaft 11 to the input shaft 13. During disengagement of the lockup clutch 17, the torque converter 2 reduces the rotational speed of the crankshaft 11 and also amplifies the torque of the crankshaft 11 to thereby transmit the torque of the crankshaft 11 to the input shaft 13.

The forward/backward travel switching mechanism 3 uses a planetary gear mechanism, and comprises a sun gear 18 fixed to the input shaft 13, a plurality of pinions 20 which are supported by a planetary carrier 19 and in mesh with the sun gear 18, and a ring gear 21 in mesh with the pinions 20. The ring gear 21 is configured such that it is connectable to the input shaft 13 via a forward clutch 22, and the planetary carrier 19 is configured such that it is connectable to the casing 15 via a reverse brake 23.

When the forward clutch 22 is engaged, the input shaft 13 is directly connected to a pulley drive shaft 24 integrally formed with the ring gear 21, whereby the pulley drive shaft 24 rotates at the same speed and in the same direction as the input shaft 13. When the reverse brake 23 is engaged, the planetary carrier 19 is held by the casing 15, whereby the pulley drive shaft 24 has its rotational speed reduced with respect to the rotational speed of the input shaft 13, and rotates in a direction opposite to the direction of rotation of the input shaft 13.

The CVT 4 comprises a drive pulley 25 supported on the pulley drive shaft 24, a driven pulley 27 supported on an output shaft 26, and a metal belt 28 wound around the drive pulley 25 and the driven pulley 27. The drive pulley 25 includes a fixed-side pulley half body 25a fixed to the pulley drive shaft 24, a movable-side pulley half body 25b axially slidably and also relatively unrotatably supported on the pulley drive shaft 24, and two cylinder chambers 25c. The movable-side pulley half body 25b is urged toward the fixed-side pulley half body 25a by the oil pressure supplied to the cylinder chambers 25c. The driven pulley 27 includes a fixed-side pulley half body 27a fixed to the output shaft 26, a movable-side pulley half body 27b axially slidably and also relatively unrotatably supported on the output shaft 26, and one cylinder chamber 27c. The movable-side pulley half body 27b is urged toward the fixed-side pulley half body 27a by the oil pressure supplied to the cylinder chamber 27c.

A first control oil pressure PDR is caused to act on the cylinder chambers 25c of the drive pulley 25, while a second control oil pressure PDN is caused to act on the cylinder chamber 27c of the driven pulley 27. By reducing the first control oil pressure PDR, the movable-side pulley half body 25b of the drive pulley 25 is moved away from the fixed-side pulley half body 25a to reduce the effective diameter of the pulley, whereas by increasing the second control oil pressure PDN, the movable-side pulley half body 27b of the driven pulley 27 is moved closer to the fixed-side pulley half body 27a to increase the effective diameter of the pulley. As a consequence, a transmission ratio RATIO of the CVT 4 is increased (changed in a direction toward a transmission ratio for low-speed traveling). It is to be noted that even when only one of the increase in the first control oil pressure PDR and the decrease in the second control oil pressure PDN is performed, the transmission ratio RATIO is similarly changed.

Inversely, when the first control oil pressure PDR is increased and the second control oil pressure PDN is reduced, the movable-side pulley half body 25b of the drive pulley 25 is moved closer to the fixed-side pulley half body 25a to increase the effective diameter of the pulley, and also the movable-side pulley half body 27b of the driven pulley 27 is moved away from the fixed-side pulley half body 27a to reduce the effective diameter of the pulley. As a consequence, the transmission ratio RATIO is reduced (changed in a direction toward a transmission ratio for high-speed traveling). It is to be noted that even when only one of the decrease in the first control oil pressure PDR and the increase in the second control oil pressure PDN is performed, the transmission ratio RATIO is similarly changed.

A first reduction gear 29 provided on the output shaft 26 is in mesh with a second reduction gear 31 provided on a reduction shaft 30, and a final drive gear 32 provided on the reduction shaft 30 is in mesh with a final driven gear 33 of the differential gear 6. The drive wheels 7 are connected to left and right axles 34 extending from the differential gear 6.

The first and second control oil pressures PDR and PDN supplied respectively to the cylinder chambers 25c and the cylinder chamber 27c of the CVT 4 are controlled by an electronic control unit (hereinafter referred to as the "ECU") 50 via a hydraulic controller 40. From an engine rotational speed sensor 54 which detects a rotational speed NE of the engine 1, a detection signal is supplied to the ECU 50. Further, detection signals from other various sensors, not shown, are supplied to the ECU 50. The ECU 50 controls the first and second control oil pressures PDR and PDN according to the detected vehicle traveling speed VP, accelerator pedal operation amount AP, engine rotational speed NE, and so forth.

Figure 2:
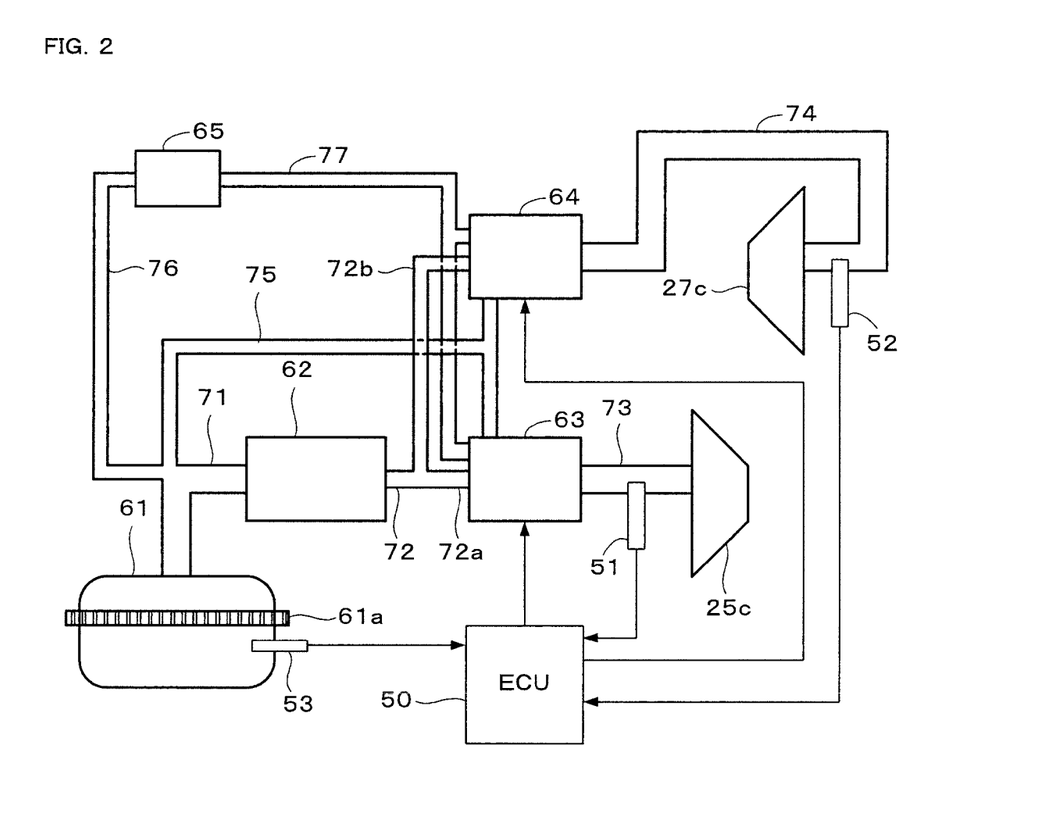
FIG. 2 A diagram showing a configuration of the hydraulic controller appearing in FIG. 1.

As shown in FIG. 2, the hydraulic controller 40 comprises a reservoir 61 which has a strainer 61a and stores hydraulic oil, a hydraulic pump unit 62 which pumps hydraulic oil from the reservoir 61 and pressurizes the hydraulic oil, a first pressure regulating valve unit 63 which regulates the first control oil pressure PDR supplied to the cylinder chambers 25c of the drive pulley 25, a second pressure regulating valve unit 64 which regulates the second control oil pressure PDN supplied to the cylinder chamber 27c of the driven pulley 27, an oil passage 71 which connects between the reservoir 61 and the hydraulic pump unit 62, an oil passage 72 which connects between the hydraulic pump unit 62 and the first and second pressure regulating valve units 63 and 64, an oil passage 73 which connects between the first pressure regulating valve unit 63 and the cylinder chambers 25c, and an oil passage 74 which connects between the second pressure regulating valve unit 64 and the cylinder chamber 27c, an oil passage 75 which returns surplus hydraulic oil in the first and second pressure regulating valve units 63 and 64 to the reservoir 61, an electric oil pressure pump 65 driven by electric power supplied from a battery (not shown), an oil passage 76 which connects between a suction port of the electric oil pressure pump 65 and the oil passage 71, and an oil passage 77 which connects between a discharge port of the electric oil pressure pump 65 and the first and second pressure regulating valve units 63 and 64.

The hydraulic pump unit 62 forms a variable displacement pump that is driven by the engine 1, and is capable of switching between a full capacity operation in which a discharge flow rate is maximized and a half capacity operation (partial capacity operation) in which the discharge flow rate is reduced to half of that in the full capacity operation. The oil passage 72 branches into the oil passages 72a and 72b, which are connected to the first and second pressure regulating valve units 63 and 64, respectively. The first pressure regulating valve unit 63 includes a linear solenoid valve and a regulating valve, and regulates oil pressure according to a control signal from the ECU 50 so that the first control oil pressure PDR becomes equal to a first command oil pressure PDRCMD. The second pressure regulating valve unit 64 is configured similarly to the first pressure regulating valve unit 63, and regulates oil pressure according to a control signal from the ECU 50 so that the second control oil pressure PDN becomes equal to a second command oil pressure PDNCMD.

The oil passages 73 and 74 are provided with a first oil pressure sensor 51 for detecting the first control oil pressure PDR, and a second oil pressure sensor 52 for detecting the second control oil pressure PDN, respectively. Further, the reservoir 61 is provided with an oil temperature sensor 53 for detecting a hydraulic oil temperature TOIL. Detection signals from these sensors 51 to 53 are supplied to the ECU 50.

The operation of the electric oil pressure pump 65 is controlled by the ECU 50, and the electric oil pressure pump 65 is driven during execution of idling stop control for temporarily stopping the engine 1, e.g. when a vehicle stops at an intersection or the like, to thereby prevent the first and second control oil pressures PDR and PDN from lowering.

It is to be noted that a more specific configuration of the hydraulic controller 40 is disclosed, e.g. in Japanese Laid-Open Patent Publication No. 2011-196390. Although not shown in FIG. 2, the discharge port of the hydraulic pump unit 62 is connected to a plurality of hydraulic actuators 80 (see FIG. 3) provided in the torque converter 2 and the forward/backward travel switching mechanism 3, and supplies necessary oil pressure to the hydraulic actuators 80. Further, surplus hydraulic oil in the hydraulic actuators 80 is returned to the suction port of the hydraulic pump unit 62 via oil return passages, not shown.

Figure 3:
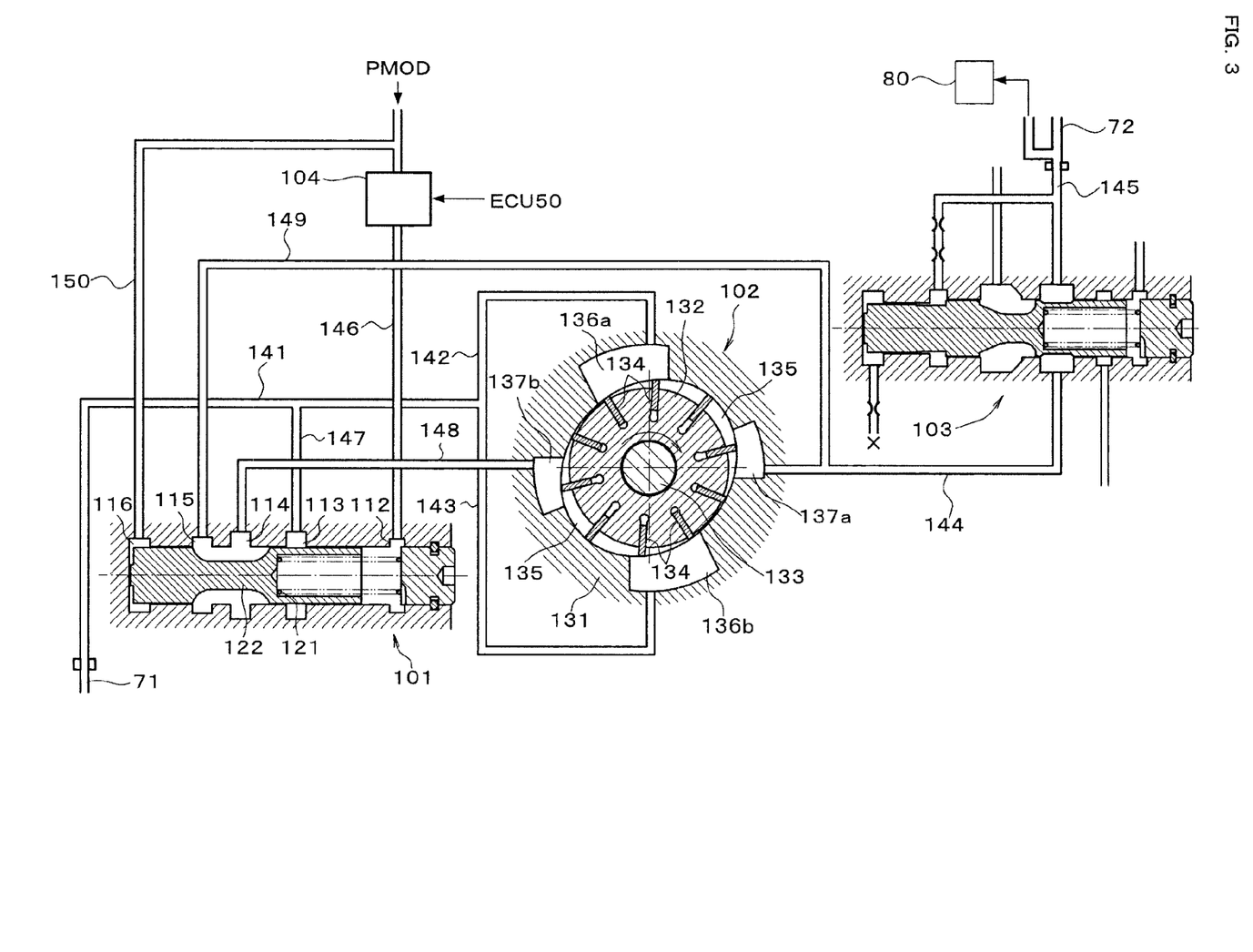
FIG. 3 A diagram showing a configuration of a hydraulic pump unit appearing in FIG. 2.

FIG. 3 is a diagram specifically showing a configuration of the hydraulic pump unit 62. The hydraulic pump unit 62 comprises a pump shift valve 101, a vane pump 102, a regulator valve 103, and an electromagnetic on-off valve 104. The vane pump 102 is driven by the driving force from the engine 1, and includes a cam ring 131 having an elliptical shape, a rotor 132 disposed within the cam ring 131, a pump shaft 133 rotatably supporting the rotor 132, a plurality of vanes 134, a plurality of operation chambers 135 defined by the cam ring 131, the rotor 132, and the vanes 134, first and second suction ports 136a and 136b, and first and second discharge ports 137a and 137b. The plurality of vanes 134 are supported in the periphery of the rotor 132 in a radially protrudable and retractable manner for sliding contact with the inner peripheral surface of the cam ring 131. The first and second suction ports 136a and 136b are communicable with the operation chambers 135 when the capacity of the operation chambers 135 is increasing. The first and second discharge ports 137a and 137b are communicable with the operation chambers 135 when the capacity of the operation chambers 135 is decreasing.

When the rotor 132 is rotated by the driving force from the engine 1 in a direction indicated by the arrow, the hydraulic oil in the first suction port 136a is drawn into the operation chambers 135 when the capacity thereof increases along with rotation of the rotor 132, and the hydraulic oil in the operation chambers 135 is discharged into the first discharge port 137a when the capacity of the operation chambers 135 decreases. Similarly, the hydraulic oil in the second suction port 136b is drawn into the operation chambers 135 when the capacity thereof increases along with rotation of the rotor 132, and the hydraulic oil in the operation chambers 135 is discharged into the second discharge port 137b when the capacity of the operation chambers 135 decreases.

An oil passage 141 connected to the oil passage 71 shown in FIG. 2 branches into oil passages 142 and 143. One oil passage 142 is connected to the first suction port 136a, and the other oil passage 143 is connected to the second suction port 136b. Oil passages 144 and 145 extending from the first discharge port 137a are connected to the oil passage 72 shown in FIG. 2 and the other hydraulic actuators 80, and the regulator valve 103 for regulating discharge pressure from the vane pump 102 to line pressure is mounted between the oil passages 144 and 145.

The pump shift valve 101 includes a spool 122 urged by a spring 121, a port 112 communicating with an oil passage 146 to which modulator pressure PMOD is supplied via the electromagnetic on-off valve 104, a port 113 communicating with the oil passage 141 via an oil passage 147, a port 114 communicating with the second discharge port 137b via an oil passage 148, a port 115 communicating with the oil passage 144 via an oil passage 149, and a port 116 communicating with an oil passage 150 to which the modulator pressure PMOD is supplied. It is to be noted that the modulator pressure PMOD is generated by regulating oil pressure supplied from an engine oil pump, not shown, to appropriate pressure.

FIG. 3 shows a state in which the full capacity operation is performed. The electromagnetic on-off valve 104 is opened by a control signal from the ECU 50, and the modulator pressure PMOD is supplied to the port 112 at a right end of the pump shift valve 101. At this time, the spool 122 of the pump shift valve 101 is moved leftward (to the position shown in the figure) by the urging force of the spring 121, although the modulator pressure PMOD is also supplied to the port 116 at a left end of the pump shift valve 101.

Accordingly, the ports 114 and 115 communicate with each other, and the second discharge port 137b of the vane pump 102 communicates with the oil passage 144 via the oil passage 148, the port 114, the port 115, and the oil passage 149. As a consequence, the hydraulic oil discharged from the first and second discharge ports 137a and 137b meet in the oil passage 144 to form a confluent flow, which is discharged via the regulator valve 103 and the oil passage 145.

On the other hand, when the half capacity operation is performed, the electromagnetic on-off valve 104 is closed by the control signal from the ECU 50 whereby the supply of the modulator pressure PMOD to the port 112 of the pump shift valve 101 is stopped, so that the modulator pressure PMOD transmitted to the port 116 at the left end of the pump shift valve 101 exceeds the urging force of the spring 121, whereby the spool 122 is moved rightward, as viewed in the figure. Accordingly, the ports 113 and 114 communicate with each other, and the second discharge port 137b of the vane pump 102 communicates with the oil passage 141 via the oil passage 148, the port 114, the port 113, and the oil passage 147. As a consequence, the hydraulic oil discharged from the second discharge port 137b is returned to the first and second suction ports 136a and 136b, and only the hydraulic oil discharged from the first discharge port 137a is supplied to the oil passage 144.

Figure 4:
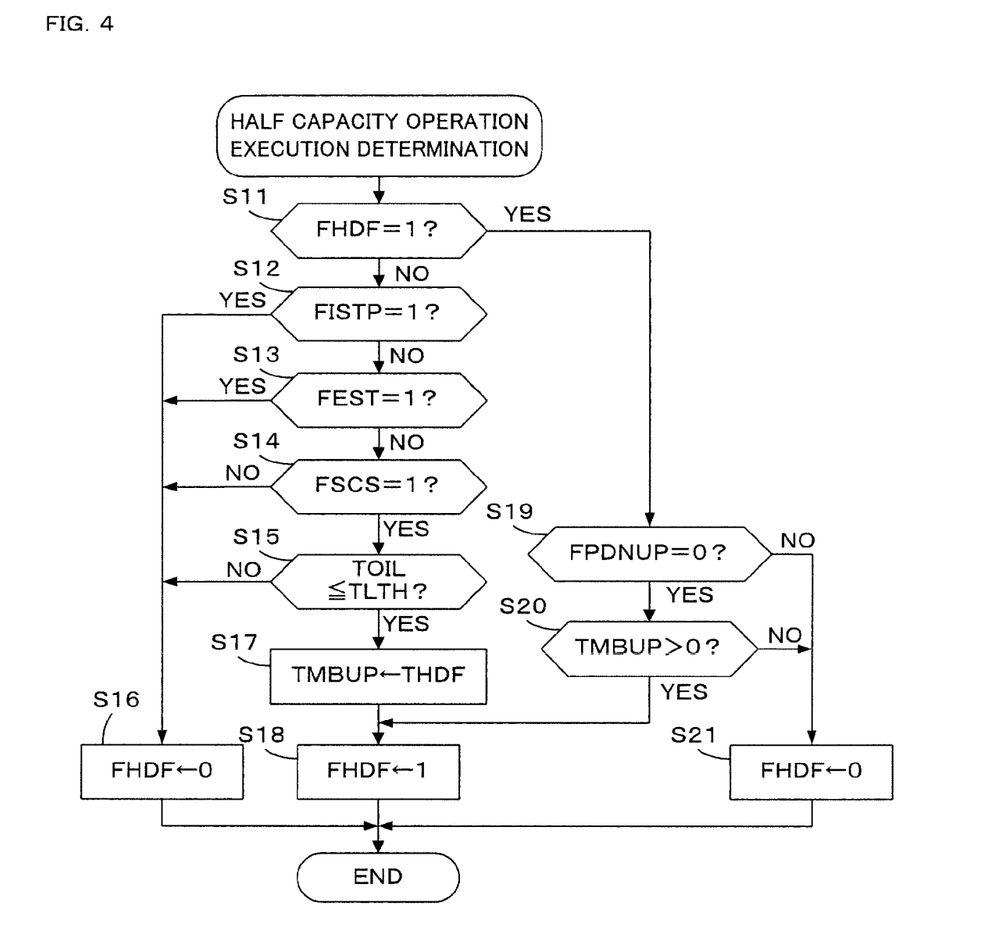
FIG. 4 A flowchart of an essential part of a process for controlling a variable displacement pump.

FIG. 4 is a flowchart of a process for determining a condition for executing the half capacity operation of the hydraulic pump unit 62 at the time of starting the engine 1. This process is executed by the ECU 50 whenever a predetermined time period elapses, and starts to be executed when the ignition switch is turned on to start the starting of the engine 1. In the present embodiment, at a time point when a starter motor has started to operate, or at a time point when the engine rotational speed NE has exceeded a start reference engine rotational speed (100 rpm), it is determined that the starting of the engine 1 has been started. Further, when a half capacity operation flag FHDF described below is equal to "0", the full capacity operation of the hydraulic pump unit 62 is performed.

In a step 11, it is determined whether or not the half capacity operation flag FHDF is equal to "0". Initially, the answer to this question is negative (NO), and the process proceeds to a step S12, in which it is determined whether or not an idling stop control flag FISTP is equal to "1". The idling stop control flag FISTP is set to "1" when a predetermined condition is satisfied (e.g. when the accelerator pedal operation amount AP is equal to "0", the vehicle speed VP is approximately equal to "0", and the brake pedal is depressed), that is, when the idling stop control for temporarily stopping the engine 1 is performed. If the answer to the question of the step 12 is negative (NO), it is determined whether or not an engine stall flag FEST is equal to "1" (step S13). The engine stall flag PEST is set to "1" when the engine stall has occurred (which is an engine stoppage caused in a state where the ignition switch is on, such engine stall occurs, for example, if the forward/backward travel clutch is engaged before the torque of the engine 1 is increased due to some malfunction, or if the lockup clutch and the forward/backward travel clutch are both engaged due to some malfunction).

If the answer to the question of the step S12 or S13 is affirmative (YES), the process proceeds to a step S16, in which the half capacity operation flag FHDF is held at "0". Accordingly, the full capacity operation is performed. This is because the possibility of occurrence of the untoward noises in the strainer 61a is low immediately after the temporary stoppage of the engine 1.

If the answer to the question of the step S13 is negative (NO), it is determined whether or not a complete explosion flag FSCS is equal to "1" (step S14). The complete explosion flag FSCS is set to "1" when determination of the complete explosion (determination of start of self-sustaining operation) of the engine 1 has been performed, i.e. when the engine rotational speed NE has reached a complete explosion reference engine rotational speed NESCS.

Initially, the answer to the question of the step S14 is negative (NO), and the process proceeds to the step S16, in which the half capacity operation flag FHDF is held at "0". Accordingly, the full capacity operation is performed. When the determination of the complete explosion has been performed, the answer to the question of the step S14 becomes affirmative (YES), and it is determined whether or not the hydraulic oil temperature TOIL is equal to or lower than a low temperature reference threshold value TLTH (e.g. −15°

C.) (step S15). If the answer to this question is negative (NO), the process proceeds to the above-described step S16.

On the other hand, in the step S15, if TOIL is equal to or lower than TLTH, it is determined that the execution condition of the half capacity operation is satisfied. Then, a down-count timer TMBUP is set to a predetermined time period THDF (e.g. 4.5 seconds) (step S17), and the half capacity operation flag FHDF is set to "1" (step S18). Accordingly, switching from the full capacity operation to the half capacity operation is performed.

After execution of the step S18, the answer to the question of the step 11 becomes affirmative (YES), and it is determined whether or not a filling completion flag FPDNUP is equal to "0". The filling completion flag FPDNUP is set to "1" when it is determined that filling of the cylinder chamber 27c in the driven pulley 27 of the CVT 4 with the hydraulic oil has been completed. Specifically, when the second control oil pressure PDN detected by the second oil pressure sensor 52 has reached a predetermined threshold value PDNTH, it is determined that the filling of the cylinder chamber 27c of the driven pulley 27 has been completed.

Initially, the answer to the question of the step S19 is affirmative (YES), and the process proceeds to a step S20, in which it is determined whether or not the value of the timer TMBUP is greater than "0". Initially, the answer to this question is also affirmative (YES), and the process proceeds to the step S18 to continue the half capacity operation.

Thereafter, when the answer to the question of the step S19 or S20 becomes negative (NO), the half capacity operation flag FHDF is returned to "0" (step S21). Accordingly, switching from the half capacity operation to the full capacity operation is performed.

Figure 5:
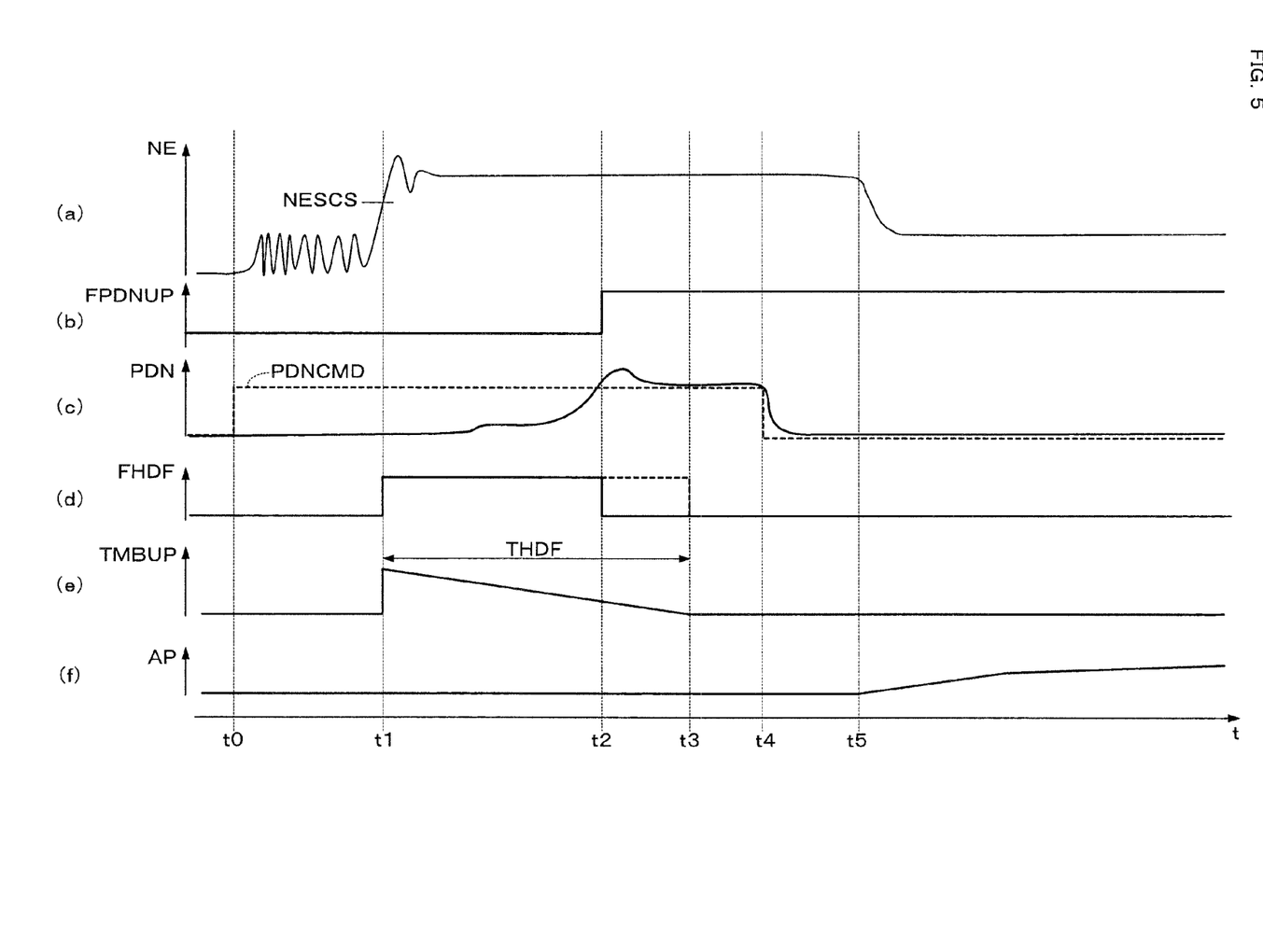
FIG. 5 A timing chart useful in explaining the process in FIG. 4.

FIG. 5 is a timing chart useful in explaining the control by the process of FIG. 4, in which FIGS. 5(a) to 5(f) show changes in the engine rotational speed NE, the filling completion flag FPDNUP, the second control oil pressure PDN, the half capacity operation flag FHDF, the timer TMBUP, and the accelerator pedal operation amount AP, respectively. In FIG. 5(c), the second command oil pressure PDNCMD, which is a command value of the second control oil pressure PDN, is indicated by the broken line. It is to be noted that FIG. 5 shows an operation example in a state where the hydraulic oil temperature TOIL is equal to or lower than the low temperature reference threshold value TLTH.

The starting of the engine 1 is started at a time t0, and the second command oil pressure PDNCMD is set to a value for promoting filling of the cylinder chamber 27c with the hydraulic oil. At this time, the half capacity operation flag FHDF is equal to "0", and the full capacity operation of the hydraulic pump unit 62 is performed. At a time t1, the determination of the complete explosion is performed, and the half capacity operation flag FHDF is set to "1", whereby the full capacity operation is switched to the half capacity operation. At this time, the timer TMBUP is set to the predetermined time period THDF to start down counting.

At a time t2, when the second control oil pressure PDN reaches the predetermined threshold value PDNTH, the filling completion flag FPDNUP is set to "1", and the half capacity operation flag FHDF is returned to "0". Accordingly, the half capacity operation is switched to the full capacity operation. It is to be noted that in a case where the second control oil pressure PDN does not reach the predetermined threshold value PDNTH within the predetermined time period THDF after the time t1 due to some cause, the half capacity operation flag FHDF is returned to "0" at a time t3, as indicated by the broken line in FIG. 5(d).

Although not directly related to the FIG. 4 process, FIG. 5(c) shows that the second command oil pressure PDNCMD is reduced at a time t4, and FIG. 5(f) shows that the accelerator pedal operation amount AP starts to be increased (the vehicle start operation is started) at a time t5.

Figure 6:
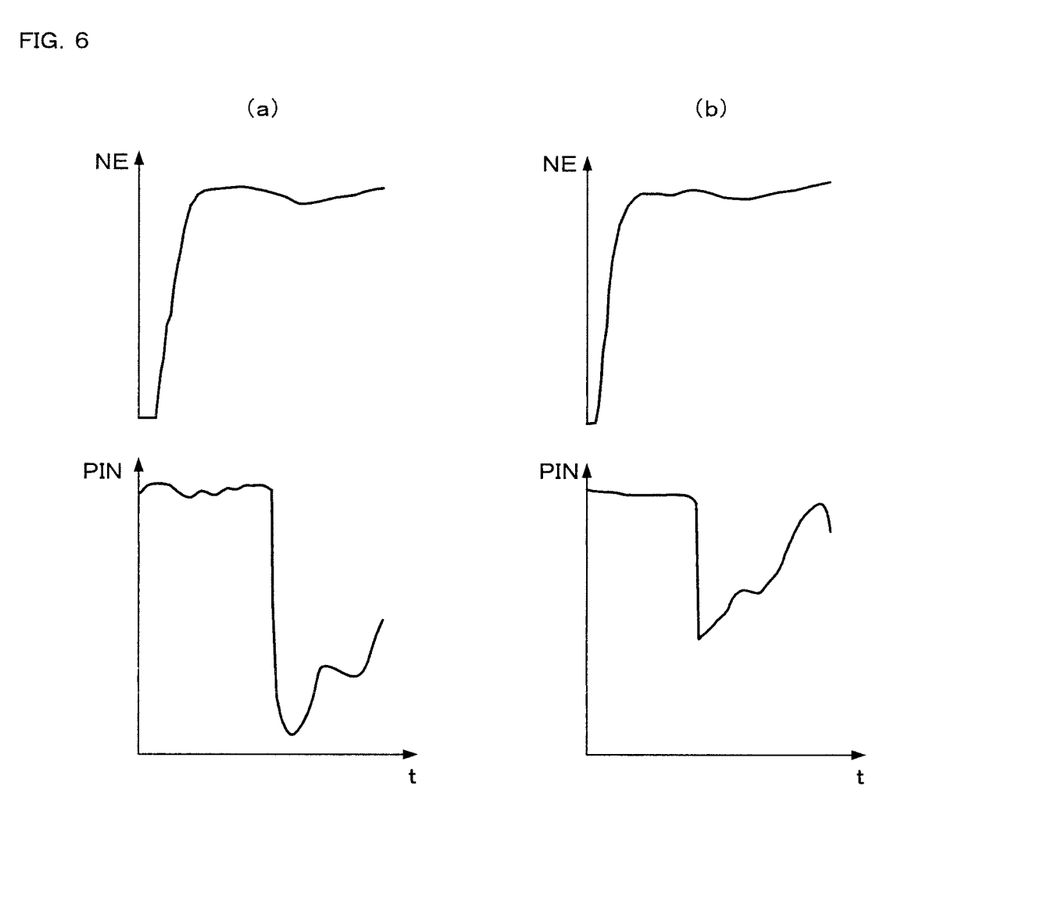
FIG. 6 Timing charts showing changes in an engine rotational speed (NE) and a suction pressure (PIN) of the variable displacement pump at the start of a drive source (internal combustion engine).

FIG. 6 shows changes in the engine rotational speed NE and suction pressure PIN of the hydraulic pump unit 62 at the start of the engine 1, in which FIG. 6(a) corresponds to an example in which only the full capacity operation is performed, and FIG. 6(b) corresponds to an example in which the process shown in FIG. 4 is performed whereby the half capacity operation is temporarily performed.

It has been confirmed that the untoward noises generated in the reservoir 61 (strainer 61a) become louder as the amount of drop in the suction pressure PIN (negative pressure) increases, and it can be confirmed that the amount of drop in the suction pressure PIN is reduced by performing the half capacity operation, which suppresses the volume of the untoward noises to a low level.

As described hereinabove, in the present embodiment, when the engine rotational speed NE reaches the complete explosion reference engine rotational speed NESCS and the hydraulic oil temperature TOIL is equal to or lower than the low temperature reference threshold value TLTH immediately after beginning the starting of the engine 1, the half capacity operation (partial capacity operation) of the hydraulic pump unit 62 is performed. It has been found that the untoward noises tend to be larger, when the engine rotational speed NE becomes equal to or higher than the complete explosion reference engine rotational speed NESCS to make the rotational speed of the vane pump 102 become relatively high, and the hydraulic oil temperature TOIL is equal to or lower than the low temperature reference threshold value TLTH, immediately after the starting of the engine 1 is begun. By performing the half capacity operation when such conditions are satisfied, it is possible to effectively suppress generation of the untoward noises.

Further, after starting the half capacity operation, when the detected second control oil pressure PDN has reached the predetermined threshold value PDNTH, the half capacity operation is switched to the full capacity operation. When the detected second control oil pressure PDN has reached the predetermined threshold value PDNTH, the hydraulic oil is recirculated to the suction ports 136a and 136b of the vane pump 102 via the oil passage 75 and the suction port of the hydraulic pump unit 62, which reduces the amount of drop in the suction pressure PIN of the hydraulic pump unit 62 (negative pressure). Accordingly, even when the half capacity operation is switched to the full capacity operation, no large untoward noise is generated. Consequently, by switching the half capacity operation to the full capacity operation when the detected second control oil pressure PDN has reached the predetermined threshold value PDNTH, it is possible to quickly increase the hydraulic pressure at the start of the engine 1 by minimizing the time period during which the half capacity operation is performed.

Further, when the engine 1 is temporarily stopped after the engine rotational speed NE has become equal to or higher than the complete explosion reference engine rotational speed NESCS to start the self-sustaining operation, in other words, when the above-described idling stop control is performed or when the engine stall occurs, the half capacity operation is not performed upon restarting the engine operation. When the engine 1 is temporarily stopped after the start of operation thereof, the hydraulic oil remains in the hydraulic actuators of the cylinder chambers 25c and 27c and the like, and hence the hydraulic oil is recirculated into the hydraulic pump unit 62 via the oil return passage 75 even immediately after the start of the operation of the engine 1, so that the amount of drop in the suction pressure PIN (negative pressure on the downstream side of the strainer) is relatively small. Accordingly, in such case, the possibility of generation of untoward noises is low. Consequently, by avoiding unnecessary execution of the half capacity operation, it is possible to obtain advantageous effects of preventing delay in the initial rise of the hydraulic pressure when starting the engine 1 and thereby preventing degradation of the start control response and reduction in the lubrication performance.

In the present embodiment, the hydraulic pump unit 62 forms the variable displacement pump, and the engine rotational speed sensor 54, the oil temperature sensor 53, and the second oil pressure sensor 52 correspond to the drive source rotational speed detecting means, the oil temperature detecting means, and the oil pressure detecting means, respectively. The first and second pressure regulating valve units 63 and 64 and the cylinder chambers 25c and 27c correspond to the hydraulic actuator. The oil passages 72 (72a and 72b), 73, and 74 correspond to the oil supply passage, and the oil passage 75 corresponds to the oil return passage. The ECU 50 forms the operation start determining means and the starting operation control means.

It is to be noted that the present invention is by no means limited to the embodiment described above, but various modifications may be made. For example, in the above-described embodiment, the hydraulic pump unit 62 is used as the variable displacement pump. Alternatively, a variable displacement pump of such a type as disclosed in Japanese Laid-Open Patent Publication No. H07-4362 may be used.

Further, in the above-described embodiment, the half capacity operation is performed as an example of the partial capacity operation. Alternatively, the full capacity operation may be switched to the partial capacity operation which is lower in the discharge flow rate than the full capacity operation.

Further, in the above-described embodiment, the vehicle provided with the CVT 4 as the automatic transmission is shown. Alternatively, the present invention is applicable to a variable displacement pump which supplies oil pressure necessary for an ordinary automatic transmission capable of selecting one of a plurality of gear ratios under the control of the ECU 50.

Further, in the above-described embodiment, an example where the second oil pressure sensor 52 is used as the oil pressure detecting means, is shown. Alternatively, the first oil pressure sensor 51 or an oil pressure sensor provided in any of the other hydraulic actuators 80 may be used as the oil pressure detecting means. In this case, it is desirable to determine in advance the relationship between the detected oil pressure and the recirculation start timing at which recirculation of surplus hydraulic oil to the suction port of the variable displacement pump is started, and set an oil pressure corresponding to the recirculation start timing as the "predetermined oil pressure".

Further, the drive source of the vehicle is not limited to the internal combustion engine. Alternatively, an electric motor or a combination of the electric motor and the internal combustion engine may be employed as the drive source of the vehicle.

DESCRIPTION OF REFERENCE NUMERALS

1 Internal combustion engine (drive source)
4 Continuously variable transmission (automatic transmission)
25c, 27c Cylinder chamber (hydraulic actuator)
50 Electronic control unit (operation start determining means, starting operation control means)
52 Second oil pressure sensor (oil pressure detecting means)
53 Oil temperature sensor (oil temperature detecting means)
54 Engine rotational speed sensor (drive source rotational speed detecting means)
62 Hydraulic pump unit (variable displacement pump)
63, 64 Pressure regulating valve unit (hydraulic actuator)
72 (72a, 72b) Oil passage (oil supply passage)
75 Oil passage (oil return passage)

The invention claimed is:

1. A control system for a variable displacement pump for pressurizing hydraulic oil, the variable displacement pump being driven by a drive source for driving a vehicle, and switchable between a full capacity operation in which a discharge flow rate is maximized and a partial capacity operation in which the discharge flow rate is lower than that in the full capacity operation, the control system comprising:

a drive source rotational speed sensor configured to detect a rotational speed of the drive source;
an oil temperature sensor configured to detect a temperature of the hydraulic oil; and
a control unit configured to determine that an operation for starting the drive source has been performed, and perform the partial capacity operation of the variable displacement pump when the detected rotational speed of the drive source is equal to or higher than a predetermined rotational speed and the detected temperature of the hydraulic oil is equal to or lower than a predetermined temperature, immediately after the operation for starting the drive source is performed,
wherein the vehicle includes an automatic transmission and a hydraulic controller for controlling the automatic transmission,
wherein the hydraulic controller includes a hydraulic actuator, an oil supply passage for supplying hydraulic oil from a discharge port of the variable displacement pump to the hydraulic actuator, an oil return passage for returning the hydraulic oil from the hydraulic actuator to a suction port of the variable displacement pump, and an oil pressure sensor configured to detect a hydraulic pressure in the oil supply passage, and
wherein the control unit is configured to switch the partial capacity operation to the full capacity operation when the detected hydraulic pressure reaches a predetermined oil pressure after starting the partial capacity operation.

2. The control system as claimed in claim 1, wherein when the drive source is temporarily stopped after the rotational speed of the drive source becomes equal to or higher than the predetermined rotational speed, the control unit does not perform the partial capacity operation upon starting the operation immediately after the temporary stoppage of the drive source.

* * * * *